UNITED STATES PATENT OFFICE.

CYPRIEN T. DU MOTAY AND EDWARD STERN, OF PARIS, FRANCE.

IMPROVEMENT IN THE MANUFACTURE OF FUEL FROM CARBONACEOUS POWDERS, &c.

Specification forming part of Letters Patent No. 210,304, dated November 26, 1878; application filed August 6, 1878.

*To all whom it may concern:*

Be it known that we, CYPRIEN TESSIÉ DU MOTAY and EDWARD STERN, both of Paris, France, have invented a new and useful Process for the Agglomeration of all Kinds of Carbonaceous Powders, of which the following is a full, true, and exact description, enabling those skilled in the art to carry out the same.

The object of our invention is to render available the refuse carbonic powders, such as the dust or powder of coal, coke, lignite, anthracite, peat, charcoal, and similar substances, for burning purposes, and this we do by uniting them together with the refuse of petroleum or petroleum-tar. This petroleum-tar is, however, in its ordinary condition, too liquid to serve this purpose successfully and it becomes necessary to treat this petroleum-tar with chemical substances before it is capable of uniting together firmly the powders above referred to. The tars which are derived from the crude petroleum are in too liquid a state to economically and practically unite, either when they are heated or cold, with the small particles above described.

In order that these petroleum-tars serve practically to accomplish the above result, I subject them first to chemical treatment, which gives them the requisite plasticity to successfully unite the carbonic refuse above described.

I have discovered that petroleum-tars unite in a ratio between five and twenty per cent., according to their fluidity, with a mixture formed of equal parts of hydrate of lime or of magnesia, or of magnesium-lime, called "dolomite," with half a part of kaolin or clay, or of silicious-clay earth, and assume a degree of plasticity equal to, or perhaps greater than, that of coal-tar. In this condition mix with the dust or residue of coal, coke, lignite, anthracite, or charcoal, and press in a hydraulic or mechanical press. They unite either hot or cold with the above-described powders or residue, and form bricks or prisms, and masses of all kinds of shapes, just as rich coal-tars actually do.

The percentages of composition of this mixture would be: Petroleum, ninety per cent.; hydrate of lime or magnesia, five per cent.; kaolin, five per cent.; or if the petroleum-tar was very liquid, petroleum, eighty per cent.; hydrate of lime, ten per cent., and kaolin, ten per cent.

According to the kinds of powder, dust, or residue of coal, coke, anthracite, &c., we employ from two to ten per cent. of petroleum-tar, prepared as above described.

What we claim as our invention, and desire to secure by Letters Patent, is—

The new fuel consisting of carbonaceous powder, kaolin, or clay, magnesia, or lime, and petroleum-tar, compounded in the proportions and manner substantially as shown and described.

In testimony whereof we have signed our names to this specification before two subscribing witnesses.

CYPRIEN TESSIÉ DU MOTAY.
  EDWARD STERN.

Witnesses:
  ROBT. M. HOOPER,
  CHARLES MARDELET.